(12) United States Patent
Seigneret et al.

(10) Patent No.: US 7,373,437 B2
(45) Date of Patent: May 13, 2008

(54) MULTI-CHANNEL DMA WITH SHARED FIFO

(75) Inventors: Franck Seigneret, Roquefort les pins (FR); Nabil Khalifa, Saint Laurent du Var (FR); Sivayya Ayinala, Plano, TX (US); Praveen Kolli, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 180 days.

(21) Appl. No.: 11/080,277

(22) Filed: Mar. 15, 2005

(65) Prior Publication Data

US 2006/0080477 A1 Apr. 13, 2006

(30) Foreign Application Priority Data

Oct. 11, 2004 (EP) .................................. 04292404

(51) Int. Cl.
*G06F 13/28* (2006.01)
(52) U.S. Cl. .......................... 710/22; 710/26; 710/308; 709/212
(58) Field of Classification Search .................. 710/22, 710/26; 709/212
See application file for complete search history.

(56) References Cited

U.S. PATENT DOCUMENTS 5,191,581 A * 3/1993 Woodbury et al. .......... 370/364

| 6,182,183 | B1 | 1/2001 | Wingard et al. |
| 6,336,150 | B1 | 1/2002 | Ellis et al. |
| 6,557,052 | B1 | 4/2003 | Kubo |
| 6,633,926 | B1 * | 10/2003 | Harada et al. ................. 710/22 |
| 2004/0028053 | A1 | 2/2004 | Mes |
| 2005/0223131 | A1 * | 10/2005 | Goekjian et al. ............. 710/22 |

FOREIGN PATENT DOCUMENTS

EP 0 550 163 A 7/1993

OTHER PUBLICATIONS

Harry Newton, Newton's Telecom Dictionary, Feb. 2002, CMP Books, Eighteenth Edition, p. 694.*
"High Speed Buffer for N X L Packet Multiplexing", IBM Technical Disclosure Bulletin, IBM Corp., vol. 32, No. 8A, Jan. 1990, pp. 418-421, XP000082861, ISSN:0018-8689.

* cited by examiner

*Primary Examiner*—Niketa Patel
(74) *Attorney, Agent, or Firm*—Ronald O. Neerings; Wade James Brady, III; Frederick J. Telecky, Jr.

(57) ABSTRACT

A direct memory access (DMA) circuit (200) includes a read port (202) and a write port (204). The DMA circuit (200) is a multithreaded initiator with "m" threads on the read port (202) and "n" threads on the write port (204). The DMA circuit (200) includes a data FIFO (210) which is shared by all of the logical channels and the FIFO depth can be allocated dynamically allowing for the maximum number of channels to be scheduled and concurrently active. The FIFO (210) can also be allocated to a single channel if there is only one logical channel active. The FIFO (210) increases the DMA's transfer performance, pre-fetch capacity and buffering, while maximizing pipelining.

21 Claims, 8 Drawing Sheets

MULTI-CHANNEL DMA WITH SHARED FIFO

This application claims priority under 35 USC § (e)(1) of European Patent Application Number 04292404.3, filed on Oct. 11, 2004.

FIELD OF THE INVENTION

This invention relates in general to the field of electronics and more specifically to a multi-channel DMA with shared FIFO.

BACKGROUND OF THE INVENTION

DMA is a technique that allows for hardware in a computer to access system memory independently of the system processor. Because the processor is not involved in the transfer of data, DMA is usually fast. DMA is very useful for example in real-time applications and for making backups. A few illustrative examples of hardware that use DMA circuits include sound cards, hard disk controllers and computer subsystems. Traditional DMA circuits have one or more physical channels where each physical channel is a point-to-point communication link connected from a source to a destination port. Although useful, the point-to-point links make the system inflexible and may limit the performance of the DMA for some applications.

Some traditional DMA circuits with multiple logical channels use several physical channels to perform concurrent transfers with each physical channel being associated to a separate data First-In-First-Out (FIFO) memory. With this type of design, there is a limit in the number of concurrent logical channels available since it is not possible to have more concurrent logical channels active than the number of physical channels that are available. Another problem with some DMA circuits is that their data FIFOs may be under utilized based on the channel transfer context. A need thus exists in the art for a storage circuit that can improve the reuse of the DMA and provide better flexibility and efficiency.

BRIEF DESCRIPTION OF THE DRAWINGS

The features of the present invention, which are believed to be novel, are set forth with particularity in the appended claims. The invention may best be understood by reference to the following description, taken in conjunction with the accompanying drawings, in the several figures of which like reference numerals identify like elements, and in which:

DETAILED DESCRIPTION OF THE PREFERRED EMBODIMENTS

In order to provide for an improved DMA circuit that can provide for improved flexibility and efficiency, the present invention provides for a DMA circuit that minimizes the relationship between the logical and physical channels. In one embodiment of the invention, a unified shared FIFO is provided in the DMA circuit which is shared by all of the logical channels and the depth of the FIFO is allocated dynamically. Using a dynamic shared FIFO allows for the maximum number of channels to be scheduled and concurrently active and it also allows allocation of the entire FIFO to a single channel if there is only one logical channel active. Using a dynamic shared FIFO increases the DMA's data transfer performance, including the capacity to pre-fetch and buffer data. It also allows for the maximum burst length to be used. In another embodiment of the invention, in order to prevent the occupation of the entire FIFO by one or more channels from all the currently active channels, a per-channel FIFO depth budget can be set for one or more of the channels, including all of the channels if needed.

The description will first discuss an overview of the DMA circuit and will then discuss the FIFO aspects of the DMA in more detail. As will be discussed in detail further below, the FIFO used in one embodiment of the invention relies on three memory resources:

(1). A "$2^{FD} \times OCP\_width$" data FIFO that is shared with no restriction between all of the channels. FD (stands for the FIFO Depth, depth of storage area in FIFO) and OCP_width are both RTL generic parameters. In one embodiment, the FIFO is implemented using a SRAM or flip-flop based memory.

(2). A NextReadAddress memory FIFO of size "$2^{FD} \times FD$", which contains the next address where to read the next data from the channel currently granted on the DMA Write Port side.

(3) A NextWriteAddress FIFO, also of size "$2^{FD} \times FD$", which allocates the next address where to write the next data of the channel currently serviced on the read port side. This is a true FIFO memory.

It should be noted that although specific memory sizes have been mentioned above, the present invention is not so limited and can encompass other memory sizes.

Figure 1:
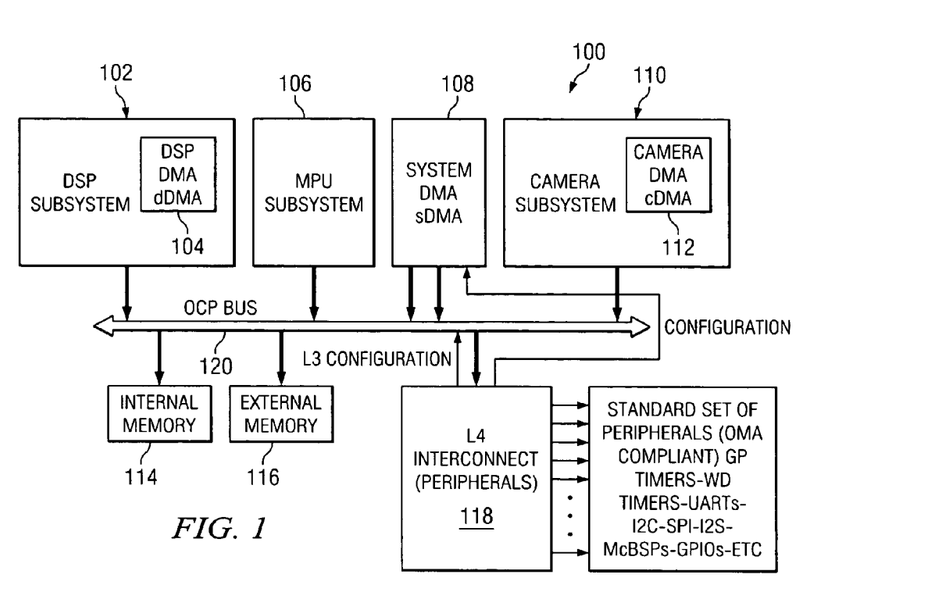
FIG. 1 shows a system level block diagram in accordance with one embodiment of the invention.

Referring now to FIG. 1, there is shown a system level block diagram of an electronic system 100 in accordance with an embodiment of the invention. System 100 includes a Main Processor Unit (MPU) subsystem 106 coupled to an Open Core Protocol (OCP) bus or system interconnect 120. The MPU subsystem 106 can include any one of a number of microprocessors or microcontrollers or similar control circuitry. A Digital Signal Processing (DSP) subsystem 102, a camera subsystem 110, an internal memory 114, an external memory 116 and a peripheral interconnect 118 are also coupled to the OCP bus 120. The peripheral interconnect 118 provides interconnection to any one of a number of peripheral devices such as timers, general purpose input/output (GPIO), etc. The DSP subsystem 102 includes a DSP DMA (dDMA) 104, the camera subsystem 110 includes a camera DMA (cDMA) 112 and a system DMA (sDMA) 108 all in accordance with embodiments of the invention.

The DMA circuits used in the dDMA, cDMA and sDMA comprise multipoint-to-multipoint DMA circuits which function as multi-threaded initiators each having four threads (or m threads) on their read port and two threads (or n threads) on their write port. The parameters m and n are preferably fixed by the thread budget allocated by the OCP interconnect for each initiator port. In this particular embodiment of the invention, n=2 and m=4, although these numbers can of course vary based on a given system's particular design requirements. The number of channels and the number of hardware requests can be changed at user configuration time. In one embodiment, the number of channels $\leq 32$ and the number of requests $\leq 127$.

Figure 2:
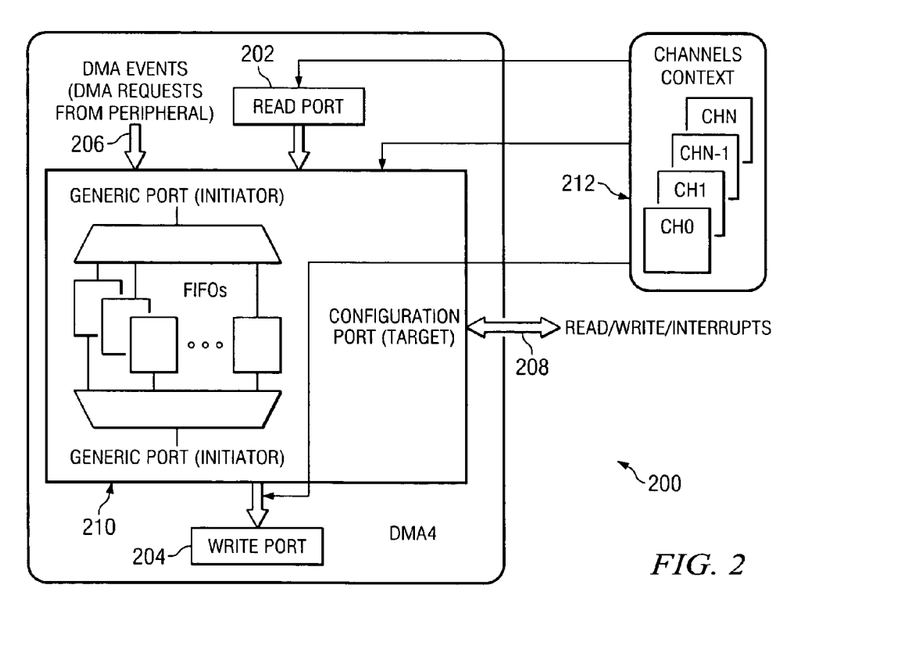
FIG. 2 shows a top level block diagram of a DMA in accordance with an embodiment of the invention.

In FIG. 2, there is shown a block diagram of a DMA circuit 200 such as used in the dDMA, sDMA and the cDMA shown in FIG. 1 in accordance with an embodiment of the invention. DMA 200 includes a read port 202, a write port 204, a configuration port 208 and a unified data first-in first-out (FIFO) 210. FIFO 210 in FIG. 2 is presented in a logical format and is shown sharing between different channels (Ch0-ChN) 212. DMA events/requests such as hardware requests are received in port 206. The DMA 200 can support in one embodiment up to 127 requests. All DMA requests can be active low (or high depending on the design) and can be configured to be either edge sensitive or transition sensitive and can be either synchronous or asynchronous. The DMA 200 includes two decoupled read and write contexts and schedulers (discussed below). The read port 202 and write port 204 can support up to m threads and n threads respectively, where each thread can perform either a single access or a burst access. A thread is associated to a service and a service can comprise a single or burst transaction. For example, if only one channel is scheduled, only one thread is associated to the channel and up to four bursts can be outstanding. Each burst can for example be 4×32 bits.

Some of the features of the DMA circuit 200 include:

1). General Features: Flexible distributed-DMA fabric, with options fixed at design time, such as channel number and port width, native OCP interface and multithreading capability at both the source and destination.

2). Master port features: Address generator compatible with logical channel features, 32-bit interface with 64-bit option fixed at design time (the multiple interface widths can be changed to include smaller or larger widths), OCP burst support, one dedicated read port/one dedicated write port, packing/unpacking support, byte addressing support and programmable write semantics model including posted or non-posted support.

3). Logical channels features: Software channel enabling, hardware channel triggering, edge/level hardware DMA request sensitive, programmable request/channel pair mapping, source/destination address generators (constant addressing, post-increment, single indexing and double indexing), different element/frame index for source and destination, unified memory buffer, shared between all channels, unified FIFO memory, size specified at design time, linked logical channel (LCH) support, speculative pre-fetch for synchronized channels, optional software controllable and capability to monitor the progress of the DMA transfer using element and frame counters.

4). Arbitration: All active channels can share ports based on arbitration and priority and can also support LCH (logical channel) first-come-first-served as well as fixed priority arbitration.

5). Security: Per channel secure attributes set by a secure transaction and secure qualifier set on the master interface when a secure channel is scheduled.

6). DMA request synchronization: Supports element, packet, frame and block synchronization.

7). Power management: Standby mode and idle mode, auto-gating capability, auto-idle and software controlled power down.

8). Interrupts: Some of the available interrupts include end frame, end block, end packet, half frame, last frame, transaction access error, secure access error and supervisor access error.

9). Debug: Through the configuration port a user can check current channel status for all channels, FIFO status, channel transfer status, data integrity, etc.

10). FIFO draining: When a channel is disabled and there is data in the corresponding FIFO, the data is drained onto the write port and transferred to a programmed destination.

11). Buffering disable: In case of source synchronized transfers, buffering can be enabled or disabled by setting a buffering disable bit (DMA4_CCR.buffering_disable) respectively to 0 or 1. When buffering is enabled, data fetched from the source side on a hardware request may not be flushed/transferred completely to the destination side until a subsequent hardware request fetches more data from the source side (to be able to pack/burst to the destination). However, if buffering is disabled, then no packing or bursting across the packet boundary is performed, and the remaining data in the packet is transferred using smaller transactions. For both cases, at the end of the block, subsequent hardware requests to flush the data on the destination side are not required. Whether buffering is disabled or not, both the source and destination are synchronized (e.g., element/frame/packet/block synchronized) during transfer. The last write transaction in the frame or in the block is non-posted write (WRNP) even if the write mode is set to 2 (WLNP). However, there should be a WRNP at the end of the packet (even if write mode=2) only in case of destination synchronization. Whether buffering is disabled or not, the packet interrupt is not generated in the source synchronized case.

12). Other features: Per channel color-key support, per channel optional solid color fill and per channel endianness conversion.

Table 1 shown below highlights some generic parameters supported by the DMA circuit 200 in accordance with an embodiment of the invention.

TABLE 1

Generic parameter list

| Generic Parameter | Type | Value range | Description |
| --- | --- | --- | --- |
| DMA4_FD | integer | [4:8] | This gives the DMA4 FIFO Depth. DMA FIFO depth = $2^{FD}$ entries. Maximum supported is 256 (FD = 8) entries. Minimum supported is 32 (FD = 5) for 32 bit OCP_WIDTH and 16 (FD = 4) for 64 bit OCP_WIDTH. Each entry can be 32 bit or 64 bit wide depending on OCP_WIDTH. |
| DMA_NUM_HWR | integer | [1:127] | This parameter is related to the number of channels and has to be fixed at design time. Maximum supported is 127 requests. |
| DMA4_NUM_CH | integer | [1:32] | Fixes the number of channels to be implemented for the DMA, which depends on the DMA use. Maximum supported is 32 channels. |
| DMA4_NUM_CHBITS | integer | [1:5] | This should always be log(DMA4_NUM_CH) to base2. |
| DMA4_OCP_WIDTH | integer | {32, 64} | 32 bits or 64 bits. This also determines the data FIFO width. |
| DMA4_OCP_BE_WIDTH | integer | {4, 8} | 4 for 32 bit OCP and 8 for 64 bit OCP. |
| DMA4_OCP_BE_WIDTH | integer | {4, 8} | 4 for 32 bit OCP, 8 for 64 bit OCP. |
| DMA4_GRAPHICS | Integer | {0, 1} | 0 for no GRAPHICS Logic, 1 to include GRAPHICS Logic |
| DMA4_PSA_REQUIRED | Integer | {0, 1} | 0 for no PSA, 1 to include PSA |

The above mentioned features are not meant to be all inclusive but are just some of the features that can be provided by the DMA circuit 200 (also referred to as DMA4) of the present invention. The flexible nature of the DMA circuit 200 allows for its use in multiple areas of a design such as in a DSP subsystem, as a system DMA and in a camera subsystem as shown in FIG. 1.

Figure 3:
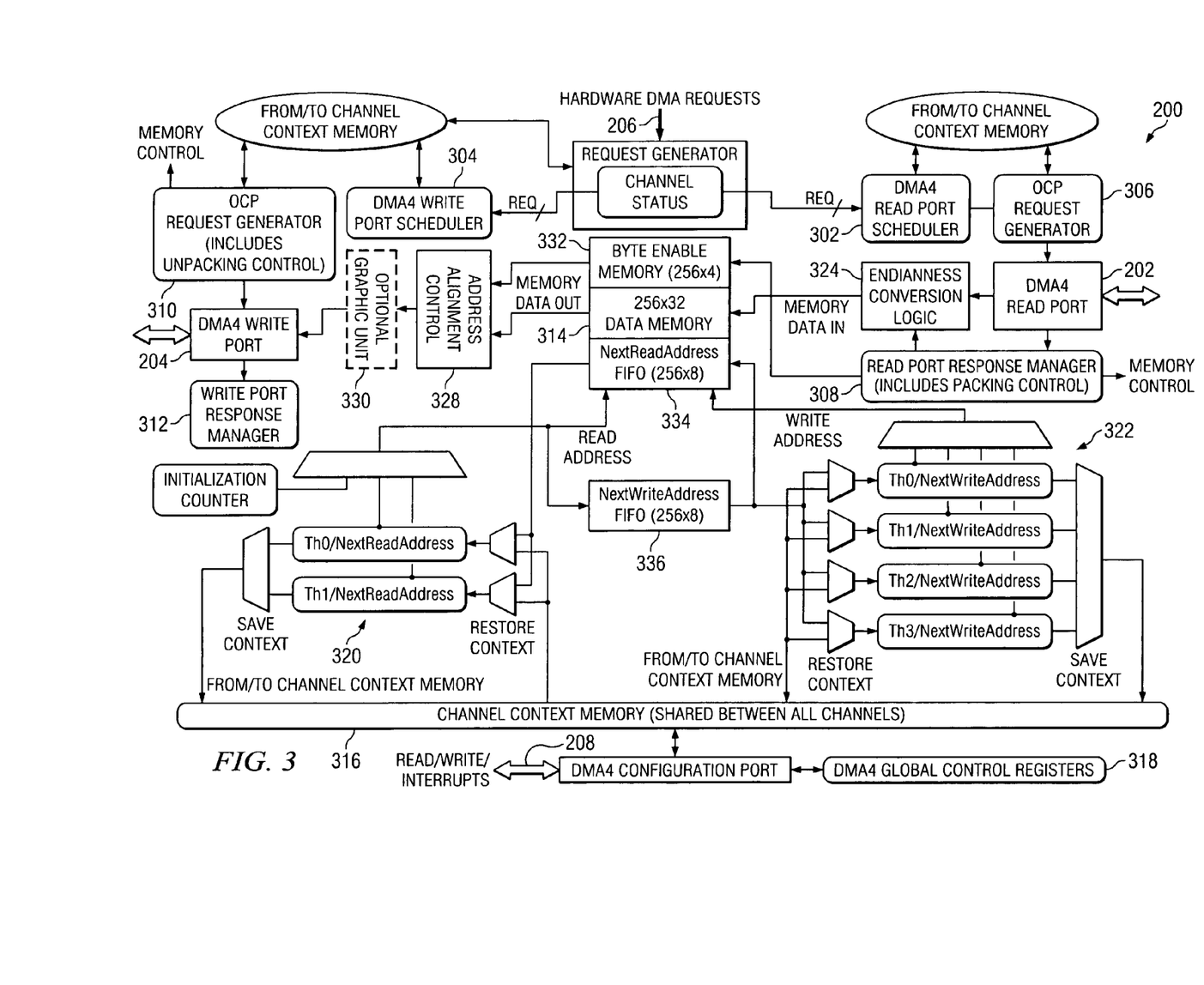
FIG. 3 shows a more detailed block diagram of the DMA shown in FIG. 2.

In FIG. 3 there is shown a more detailed block diagram of the DMA circuit 200. The DMA circuit 200 includes a read port (DMA4 Read Port) 202 and a write port (DMA4 Write Port) 204. Coupled to the DMA4 read port 202 is a channel requests scheduler (DMA4 Read Port scheduler) 302, an OCP request generator 306 and a read port response manager 308. The read port 202 is either a 32-bit or a 64-bit read-only OCP master interface, and the choice between 32-bit or 64-bit is preferably made at design time.

The DMA4 read port scheduler 302 is responsible for selecting the next channel to be serviced, and for allocating a thread identifier to be used on the OCP interface (MThreadID field). A channel is granted access to the read port 202 by the arbitration logic, for one OCP service. This can be either an OCP single transaction or an OCP burst transaction (4×32-bit/2×64-bit, 8×32-bit/4×64-bit, 16×32-bit/8×64-bit), in accordance with the channel programming for the DMA source. The channel programming can be modified based on system design requirements.

In one embodiment, a maximum of 4 thread IDs can be allocated in the read side, from 0 to 3 (Th0, Th1, Th2 and Th3). Hence the DMA circuit 200 can have up to 4 outstanding read transactions belonging to up to 4 channels in the system interconnect. For an arbitration cycle to occur, two conditions must be satisfied: (a). there is at least one channel requesting and (b) there is at least one free thread ID available. Upon an arbitration cycle, the scheduler 302 grants the highest priority channel that has an active request, allocates the thread ID, and tags this thread as Busy. The channel read context is restored from the shared channel context memory 316.

The arbitration policy implemented is "First Come First Serviced" (FCFS). On top of this arbitration, channels can be given a high-priority attribute. There are 2 queues, one high priority queue and one low priority queue (not shown in FIG. 3). Any channel that is ready to be scheduled will be put at the end of the queue, either regular (low priority) or high priority depending on a priority bit. Non-synchronized channels will be put in the queue when the software sets the enable bit. Synchronized channels will be put in the queue when the hardware DMA request comes in for them. There can be multiple channels that are ready and need to be put in the same queue at the same cycle, one from the configuration port 208 and multiple DMA requests. In this particular case, only one channel will be put in the queue (one in each queue) according to the following rule in one embodiment of the invention: CHi has a higher priority than CHj if j>i. The others will be processed in subsequent cycles. This rule can of course be modified depending on system design requirements.

The top of each queue can be scheduled in each cycle. In one embodiment, a software configurable 8-bit priority counter is used to give weighting to the priority queue. For every N (1 to 256) schedules from the priority queue one will be scheduled from the regular queue. A channel that is scheduled will go to the end of the queue after it finishes its turn on the port. At a given time, a channel cannot be allocated more than one thread ID.

Note that if more than one channel is active, each channel is given a ThreadID for the current service only, not for the whole channel transfer. The current channel number/ThreadID associations are stored, and made available to the read response manager 308. However, if only one channel is active, then one thread ID is allocated during the channel transfer and back to back service (Burst or single) can be done with a maximum of 4 consecutive bursts (e.g., 4×32) without rescheduling the channel at the end of each burst transfer. If non-burst alignment occurs at the beginning of the transfer, then the channel is rescheduled for each smaller access until burst aligned. Also, if the end of the transfer is not burst aligned, the channel is rescheduled for each one of the remaining smaller accesses.

From the restored channel context, the read port logic can generate the next OCP address sent to the OCP interface. An OCP READ request is generated by the OCP request generator 306, and is then issued on the OCP interface. The request can be qualified by sideband signals, some of the sideband signals include:

MThreadID field, based on the scheduler allocation;
MReqSecure attribute, as read from the channel context;
MReqSupervisor attribute, as read from the channel context;
MReqEndianness, as read from the channel context;
MReqDataType, as read from the channel context (element size);
MCmd/SCmdAccept handshaking is performed normally, as required by the OCP protocol.

When receiving an OCP read response, from for example a SThreadID field, the read response manager 308 can identify the channel that "owns" the data. This data is submitted to the shared-FIFO control logic, and written into the FIFO 314 at the appropriate location. Once the data is written into the FIFO 314, if this is the last data of the channel service (i.e. single data service or last data of a burst service), the threadID becomes free again and its status is updated. The last data of a response is identified by a "SRespLast" qualifier. The context for the channel just serviced is saved back into the shared channel context memory using circuitry 322 which includes four registers, one for each thread and the necessary selection and path set-up circuitry. Thread responses can be interleaved, even within bursts, on the read port 202.

The read port scheduler 302 and the write port scheduler 304 are mainly arbitrating between channels at a thread boundary. One thread is associated to one DMA service, where a service can be a single or burst transaction as mentioned previously.

In one embodiment, each channel context is composed of one read context and one write context, with the read and write contexts being scheduled separately. After a DMA request is received at the DMA request port 206, the associated channel "i" is scheduled. The channel context is loaded, then each time there is an OCP read request, one thread m (0 up to 3) is allocated during the whole read transaction. While there is a free thread, other channels can be scheduled according to the arbitration schema employed. One thread becomes free as soon as the corresponding channel read transaction (e.g., a single transaction, burst transaction of 4×32 or 8×32) is finished. Once a thread becomes free it can be allocated to another channel.

The configuration port 208 operates as a slave port and is not buffered. It enables a host (not shown) to access the entity formed by the DMA circuit 200. The configuration port 208 is used for configuration and access to status registers found in the DMA circuit 200. In one embodiment the configuration port 208 is a synchronous 32-bit data bus that supports 8, 16 and 32-bit aligned data and non-burst accesses. The configuration port 208 can also access memory locations, logical channel context and hardware requests memory locations.

Coupled to the DMA4 write port 204 is a DMA4 write port scheduler 304, an OCP request generator (includes unpacking control) 310 and a response manager 312. The write port 204 is driven from the requests coming from the data FIFO 314. There is no other correlation between channel contexts open on the read port side, and channel contexts open on the write port side. Most of the time, open read channel contexts and simultaneously open write channel contexts are different. The OCP write port is either a 32-bit or a 64-bit write-only OCP master interface, the choice between 32-bit or 64-bit is made at design time, although other designs can have different bit sizes.

The total FIFO 314 budget is fixed at design time by generic parameters FD and "OCP_width" so that the FIFO_depth=$2^{FD}$×OCP_width. There is no per-channel allocation of the DMA buffering budget, a full dynamic buffering model is implemented. The buffering budget, for one channel, is preferably bounded using a programmable threshold specified in a register entitled "DMA4_GCR".

The write port scheduler 304 is responsible for selecting the next channel to be serviced, and for allocating a thread identifier to be used on the OCP interface (MThreadID field). A channel is granted access to the write port 204 by the arbitration logic, for one OCP service, this can be either an OCP single transaction or an OCP burst transaction (4×32-bit/2×64-bit, 8×32-bit/4×64-bit, 16×32-bit/8×64 bit), in accordance with the channel programming for the DMA destination. A maximum of 2 thread IDs can be allocated, 0 or 1 (Th0 and Th1 on the write side). Hence DMA circuit 200 can have up to 2 outstanding write transactions belonging to up to 2 channels in the system interconnect in this embodiment using circuitry 320.

For an arbitration cycle to occur, two conditions must be satisfied: (a). There has to be at least one channel requesting; and (b) There is at least one free thread ID available. In an arbitration cycle, the write port scheduler 304 grants the highest priority channel that has an active request, allocates the thread ID, and tags this thread as Busy. The channel write context is restored from the shared channel context memory 316. The arbitration policy implemented is "First Come First Serviced" (FCFS), although other policies can also be used if desired. On top of this arbitration, a few channels can be given a high-priority attribute. In one embodiment, there are two queues, one a high priority queue and the other a low priority queue. Any channel that is ready to be scheduled will be put at the end of the queue, either regular (low priority) or high priority depending on the priority bit. Non-synchronized channels will be put in the queue when the software sets the enable bit. Synchronized channels are put in the queue when the hardware DMA request comes in for them.

There can be multiple channels that are ready and need to be put in the same queue at the same cycle, one from the configuration port 208 and multiple DMA requests. In this case only one channel will be put in the queue (one in each queue) according to the following rule: CHi has a higher priority than CHj if j>i. The others will be processed in subsequent cycles.

If only one channel is active, then one thread ID is allocated during the channel transfer and back to back service (Burst or single) can be done with maximum of 4 consecutive bursts (e.g., each burst can be for example 4×32-bit) without rescheduling the channel at the end of each burst transfer. If non-burst alignment at the beginning of the transfer then the channel is rescheduled for each smaller access till it is burst aligned. Also, if the end of the transfer is not burst aligned, the channel is rescheduled for each one of the remaining smaller accesses.

The top of each queue can be scheduled in each cycle. A software configurable 4 bits priority counter is used to give weighting to the priority queue. For every N (1 to 256) schedules from the priority queue one will be scheduled from regular queue. A channel that is scheduled will go to the end of the queue after it finishes its turn on the port. Note that if more than one channel is active, each channel is given a ThreadID for the current service only, not for the whole channel transfer. The current channel number/ThreadID associations are stored, and made available to the write port response manager 312.

From the restored channel context, the write port logic can generate the next OCP address sent to the OCP interface. An OCP WRITE request is then issued by the OCP request generator 310 on the OCP interface, qualified by sideband signals.

The write command used on the OCP interface can be either a posted write (OCP WR command) or a non-posted write (OCP WRNP command): The OCP write interface selects the write command to be used, based on the channel attributes as programmed by the user. There are 3 possibilities:

(1). All channel transactions are mapped on the WRNP (none posted);
(2). All channel transactions are mapped on the WR command (posted); or
(3). All channel transactions are mapped on the WR command, except the last one that is mapped on a WRNP command, so that the end-of-transfer interrupt can be delayed until the write has reached the target.

All DMA4 writes expect a response on the OCP interface. Usually, when issuing a posted write request, the response is provided very quickly by the system interconnect, whereas a non-posted write transaction gets its response later, after the effective write has been completed at the destination target. Handshaking is performed normally, as required by the OCP protocol.

When receiving an OCP write response, from the SThreadID field, the write port response manager 312 can identify the channel that owns the response. Once the data is read from the FIFO 314, if this is the last data of the channel service (i.e. single data service or last data of a burst service), the threadID becomes free again and its status is updated. The context for the channel just serviced is saved back via circuitry 320 into the shared channel context memory 316. If should be noted that thread responses can be interleaved, even within bursts, on the write port 204.

The Configuration port 208 can access all global 318 and channel registers in either 8-bit, 16-bit or 32-bit. Four of the registers need a shadow register to be read correctly:
DMA4_CSAC: Channel Source Address Counter
DMA4_CDAC: Channel Destination Address Counter
DMA4_CCEN: Channel Current transferred Element Number
DMA4_CCFN: Channel Current transferred Frame Number To make implementation easier, only one shadow register is used by the above four registers.

Packing is performed on the read port side 202 when the channel element type is narrower than the read port 202, and if this feature has been enabled by the DMA programmer. The packing feature is enabled if the DMA source is qualified as a non-packed target, and the DMA destination is qualified as a packed target. Packing is not compatible with source burst transactions, only destination burst can be enabled when packing is selected. Each time a channel requiring a packing operation is scheduled on the read port 202, only a partial write is done to the memory buffer on the appropriate byte lanes, with the valid bytes of the current OCP response. Consequently, the data memory must provide byte access granularity during a write operation in the data FIFO 314. The byte enable memory must also be updated accordingly.

No new NextWriteAddress from NextWriteAddress FIFO 336 is allocated until the memory word is complete, i.e. when the last byte of the memory word is effectively written. The channel FIFO level is also updated on this event. This update event is triggered based on the current byte address of the read access, with respect to the element type and the transaction endianness. Based on address alignment and total transfer count, the first and last packed-words can be partial. This is reported to the write port side using the byte enable memory 332.

Unpacking is done on the write port side when the channel element type is narrower than the write port 204, and if this feature has been enabled by the DMA programmer. The unpacking feature is enabled if the DMA source is qualified as a packed target, and the DMA destination is qualified as a non-packed target. Unpacking is not compatible with destination burst transactions, only source burst can be enabled when unpacking is selected. When both source and destination targets are packed or unpacked then packing and unpacking operations are disabled.

Each time a channel requiring an unpacking operation is scheduled on the write port 204, a regular word read is performed from the memory buffer, at the address stored in the current NextReadAddress register 320. Only valid bytes are taken into account, and the NextReadAddress register is only updated from the NextReadAddress FIFO 334 when all bytes within a data FIFO word have been read and sent to the write port 204. On a consistent manner, this NextReadAddress must be declared free again following the last read to the FIFO (i.e. written into the NextWriteAddress FIFO 336).

The DMA 200 targets can have different endianness type. An endianness module 324, is used to match the endianness of the source target and the destination target. The endianness conversion takes place if there's an endianness mismatch. This is done according to a source and destination endianness control bit-field (DMA4_CSDP.Src_Endianness=X) and (DMA4_CSDP.Dst_Endianness=Y). If X=Y then no endianess conversion is performed, however, if X/=Y then an endianness conversion is performed (big endian to little endian or little endian to big endian).

At the system level, more than one endianness module may have the capability to convert endianness if required. It is possible to inform the next module in the target of the read and write request paths to lock the endianness. This is qualified by an in-band signal (MreqEndiannessLock) when (DMA4_CSDP.Src_Endianness_lock) or (DMA4_CSDP.Dst_Endianness_lock) is set to 1. In any case, the DMA 200 generates an MReqDataType and MREqEndianness in-band qualifiers.

In the DMA4 200, address programming registers for the source target and the destination target, it is assumed that start addresses are always aligned on an element size boundary:
8-bit elements, start addresses aligned on bytes,
16-bit elements, start addresses aligned on 16-bit memory words, and
32-bit elements, start addresses aligned on 32-bit memory words.

Once this condition is met, there is still a potential alignment mismatch between source addresses and destination addresses (for example, when transferring a 16-bit data buffer from memory source start address 0×1000 to memory source destination address 0×10002 using a 32-bit DMA4 instance). Address alignment control 328 is required so that any source byte on any read port byte lane can be transferred on any write port byte lane.

An optional 2-D graphic module 330 provides hardware acceleration for two commonly used graphics operations:
(1). Transparent Copy (also known as transparent-bit, or source color key copy), and
(2). Constant Solid Color Fill.

Transparent Copy:

It is often desirable to transfer irregular shape information, and it is especially common in software game programs. DMA 200 supports a COLOR KEY (defined in a per channel register named DMA4_COLOR) feature for 8 bpp, 16 bpp and 24 bpp from source to destination, i.e. each element of the channel source is compared to a color key value, and those data bits (pixels) that match the color key are not written to the destination. For 8 bpp, 16 bpp and 24 bpp the data-type specified in the DMA4_CSDP register are respectively 8-bit, 16-bit and 32-bit. During 32-bit (24 bpp) data transfer the data 31:24 is '0'. The color pattern is written at the following bit field of a configuration register, DMA4_Color register which stores the COLOR KEY value as follows:

[7:0] and don't care at [23:8] for 8 bpp
[15:0] and don't care at [23:16] for 16 bpp
[23:0] for 24 bpp Burst/packed transactions can be used with no restriction. Each time there is a color key match, the write access is discarded using the write port byte enable pattern, but the write OCP transaction is performed normally. Thus, there is no performance penalty when this feature is enabled.

Figure 10:
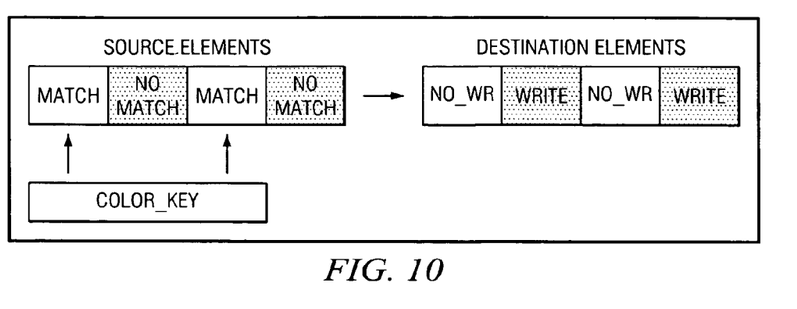
FIG. 10 shows a graphic transparent color block diagram in accordance with an embodiment of the invention.

The address of each access has to be aligned with an ES (Element Size), which corresponds to the pixel size. Each time there is a color key match, the write access is discarded using the write port byte enable pattern, but the write OCP transaction is performed normally. Burst/packed transactions can be used with no restriction. There is a configuration register, DMA4_COLOR, storing the COLOR KEY value and as previously mentioned, all of the channels have their own register. The transparent copy is preferably performed before the data is put in the data FIFO 314. A functional block diagram of a 2-dimensional graphic transparent color block diagram is shown in FIG. 10.

Solid Constant Color Fill:

This feature allows filling a region with a solid color or pattern, by repeating the data horizontally and vertically in the region. Since the solid color fill and the transparent copy functions are mutually exclusive in the same channel a "DMA4_COLOR" register is shared to set the constant color value, based on its data type. For 8 bpp, 16 bpp and 24 bpp, the data-type specified in a "DMA4_CSDP" register is respectively 8-bit, 16-bit and 32-bit. During the 32-bit (24 bpp) data transfer, the data [31:24] is "0". The color pattern is written at the following bit field of the DMA4_Color register:

[7:0] and don't care at [23:8] for 8 bpp;
[15:0] and don't care at [23:16] for 16 bpp; and
[23:0] for 24 bpp.

The register data does not come from the read port 202; but is the source for solid fill data that goes out on the write port 204.

Figure 11:
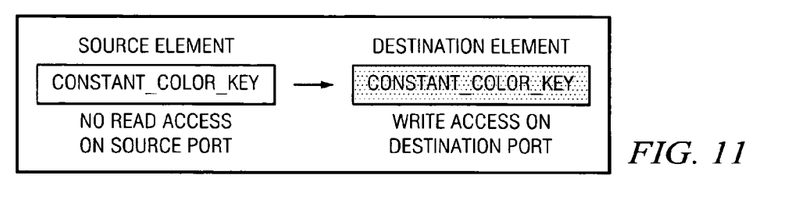
FIG. 11 shows a constant color fill block diagram in accordance with an embodiment of the invention.

The solid constant color Fill feature allows filling a region with a solid color or a pattern, by repeating the data horizontally and vertically in the region. Since the solid color fill and the transparent copy functions are mutually exclusive, the DMA4_COLOR register is shared to set the constant color value, based on its data type. The pixel color (or pattern) is replicated so that the full register width is occupied. The address of each access has to be aligned with the ES (Element Size), which corresponds to pixel size. The solid constant color fill is preferably performed at the output of the data FIFO. A functional block diagram of a 2-D constant color fill is shown in FIG. 11.

Figure 12:
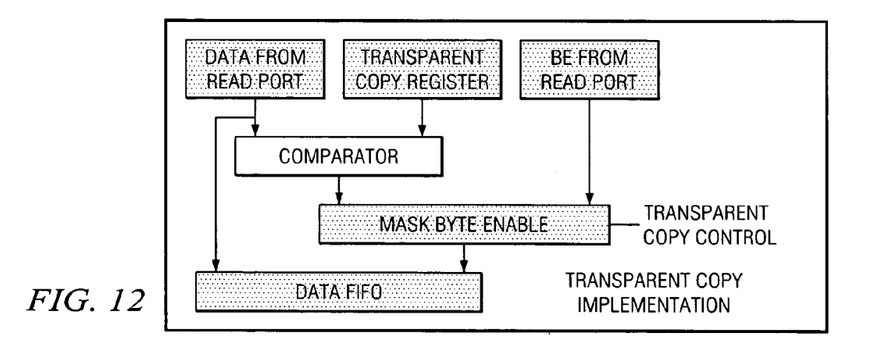
FIG. 12 shows a functional graphic module implementation for a transparent copy in accordance with an embodiment of the invention.
Figure 13:
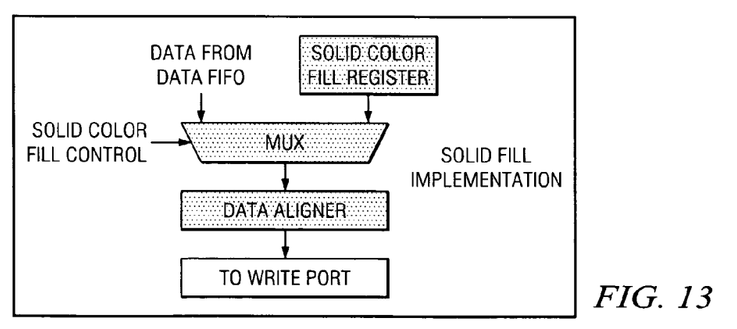
FIG. 13 shows a functional graphic module implementation for solid color fill in accordance with an embodiment of the invention.

In the case of transparent color fill mode, the pixel element is compared through a comparator unit, to the content of the color register, if the two values match the corresponding byte enables (BEs) are forced to zero going into the data FIFO. However, if the two values do not match, the BEs are written into the data FIFO unchanged. In case of the solid color there is a bypass from the color register to the write port through a multiplexer unit, which is driven by the solid color signal. The two graphic functions being mutually exclusive. In FIG. 12 there is shown a functional block diagram for the transparent copy implementation, while FIG. 13 shows a functional block diagram for a solid fill implementation in accordance with embodiments of the invention.

DMA circuit 200 can generate OCP bursts on both the read port 202 and the write port 204. The burst model complies with the OCPIP2.0 with the following characteristics:

1). Incrementing, precise bursts: The burst size can be 16 bytes, 32 bytes or 64 bytes. For a 32-bit DMA4 instance, that means 4×32 or 8×32 bursts, 16×32-bit burst, for a 64-bit DMA4 instance that means 2×64 or 4×64 bursts or 8×64 bursts. Smaller burst sizes than the programmed burst size is also allowed. This is usually used when the start address is not aligned to the programmed burst size or the data remaining to be transferred is less than the programmed burst size. Better performance is achieved than by performing single transactions till the address is aligned for programmed burst size. Because of this, 2×32 burst is allowed on 32 bit OCP interface 2). Streaming burst (OCP code=STRM): It's valid if burst mode is enabled in constant addressing mode and non packed transaction. Also the packed target must be enabled when burst is enabled in non constant addressing mode.

3). End-of-burst qualifiers are required: MReqLast and SRespLast (also used for single OCP transactions).

4). All bursts are aligned: A burst is always starting on the memory address aligned on the burst size. This does not mean the OCP parameter burst_aligned should be ON, as this parameter assumes the byte enable pattern is all 1's and constant during the whole burst. This condition is not always met on the write port 204 operating in transparent-blit mode, as the byte enable pattern is used to eliminate pixels that must not be written into the memory (when there's a match with the color key). Even with the burst_enable option on, in the channel programming at the beginning of the transfer, DMA 200 can wait for the OCP address to reach a value aligned on the burst size, before issuing burst transactions. Therefore the first channel accesses can consist of single transactions.

Whatever the transfer length, DMA 200 does not generate non-completed bursts. At the end of a channel transfer, if there is not enough data (to be read or written) for filling a full burst, single transactions are issued on the OCP interfaces.

If burst is enabled and hardware DMA request synchronization is enabled and address is not aligned on burst boundary, then DMA 200 will automatically split this burst access into multiple smaller accesses (minimum number of aligned accesses) until address is aligned on the Burst boundary. If last transfer is not burst aligned, then the remaining data are split into minimum aligned smaller access.

Figure 4:
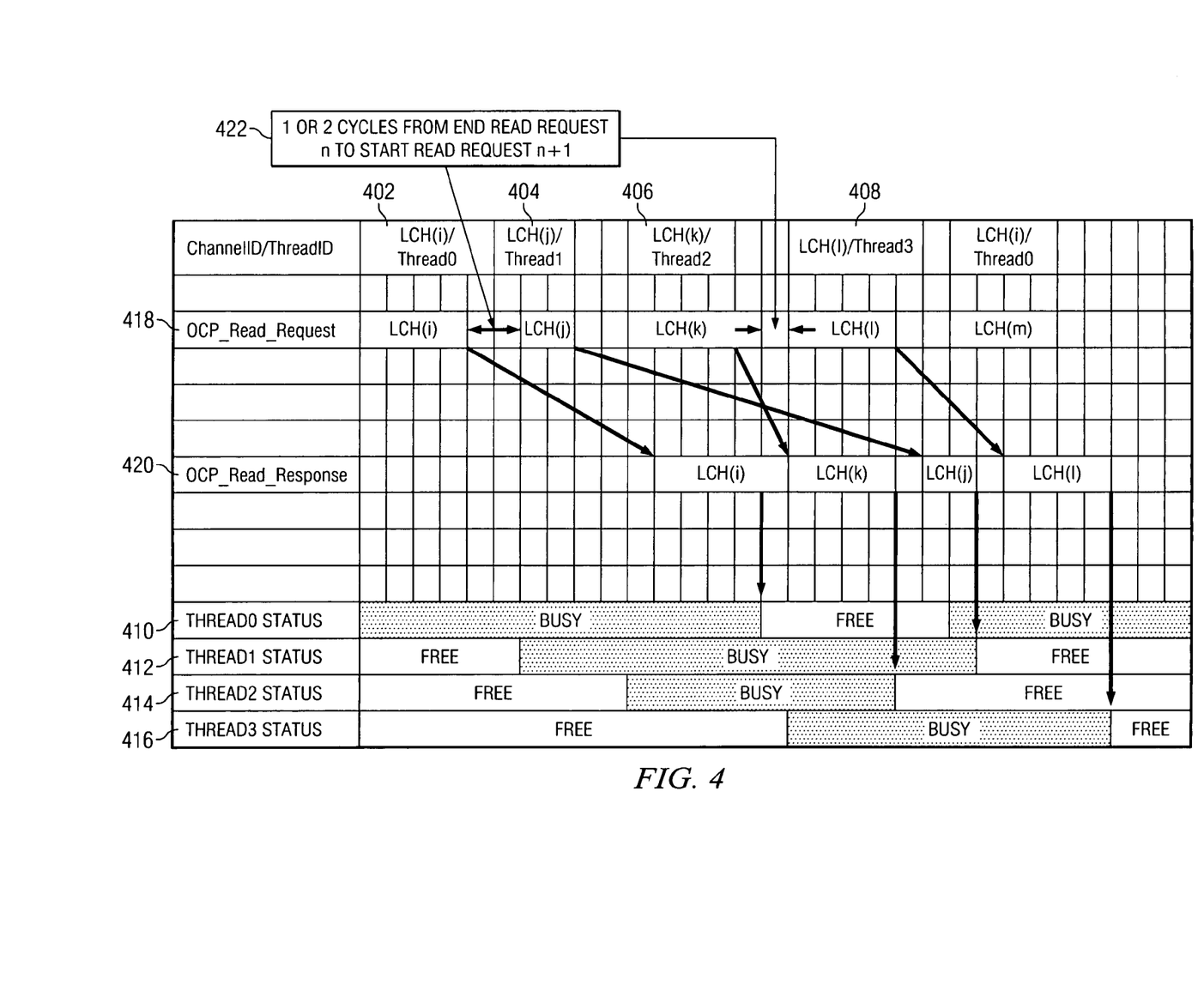
FIG. 4 shows a diagram highlighting four threads received on the read port of the DMA in accordance with an embodiment of the invention.

Referring to FIG. 4, there is shown a diagram highlighting a read port 202 multi-threading scenario were the read port has four threads (ThreadID0, ThreadID1, ThreadID2 and ThreadID3) 402-408 in accordance with an embodiment of the invention. The current status for each of the threads (0-3) is shown in time lines 410-416 respectively. With the read requests (OCP_Read_Request) and read responses (OCP_Read_Responses) highlighted on time lines 418 and 420 respectively. As shown in 422, it takes one or two cycles to switch from a first logical channel (LCH(i)) to another logical channel (LCH(j)).

Figure 5:
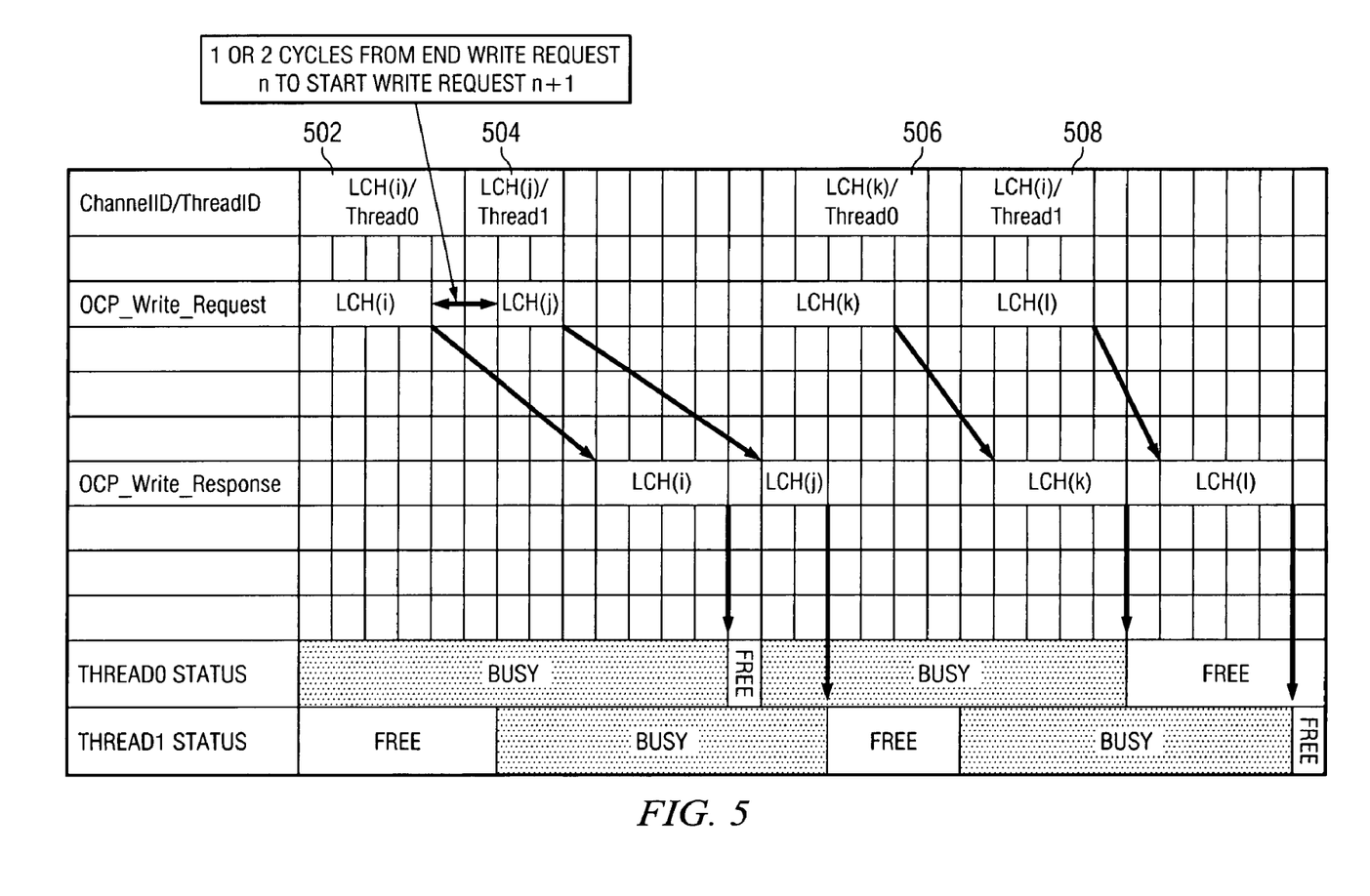
FIG. 5 shows a diagram highlighting two threads in the write port of the DMA in accordance with an embodiment of the invention.

Referring now to FIG. 5, there is shown a diagram highlighting a write port 204 multi-threading scenario in accordance with an embodiment of the invention. Each time there is an OCP write request (OCP_Write_Request); one thread n (0 up to 1) is allocated during the current write transaction. In FIG. 5, two threads, Thread0 and Thread1 are shown. While there is a free thread, other channels can be scheduled according to the arbitration schema employed in the particular design. One thread becomes free as soon as the corresponding channel write transaction (e.g., single transaction, burst transaction of 4×32 or 8×32) is finished. Once a thread becomes free, it can be allocated to another channel. FIG. 5 shows four logical channels $LCH_{(i)}$, $LCH_{(j)}$, $LCH_{(k)}$ and $LCH_{(l)}$, the current status of the two threads (Thread0 and Thread1) is also shown. As also shown, it takes one or two cycles from the end of a write request to start a new write request.

Figure 6:
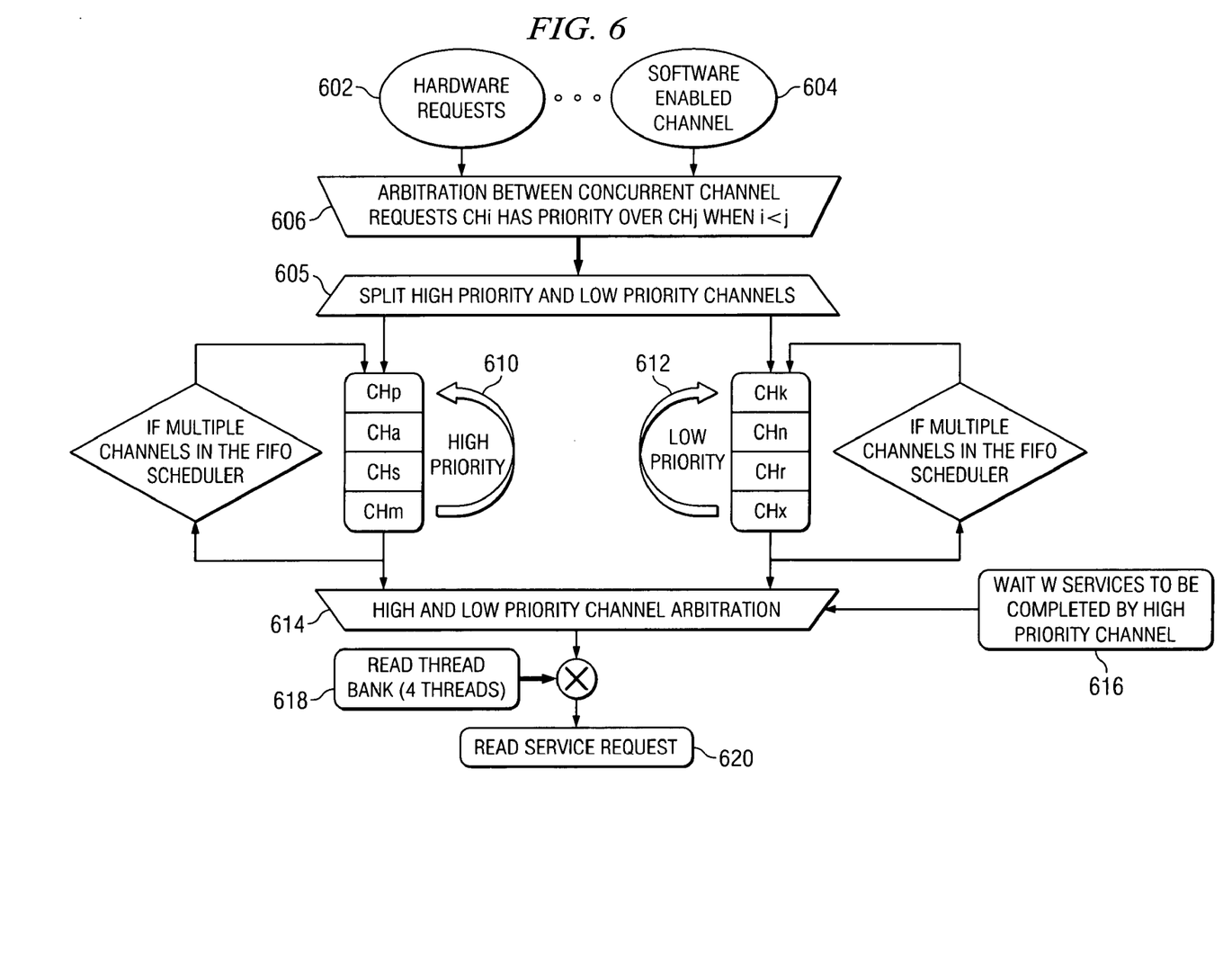
FIG. 6 shows a block diagram of a DMA read port scheduler in accordance with an embodiment of the invention.
Figure 7:
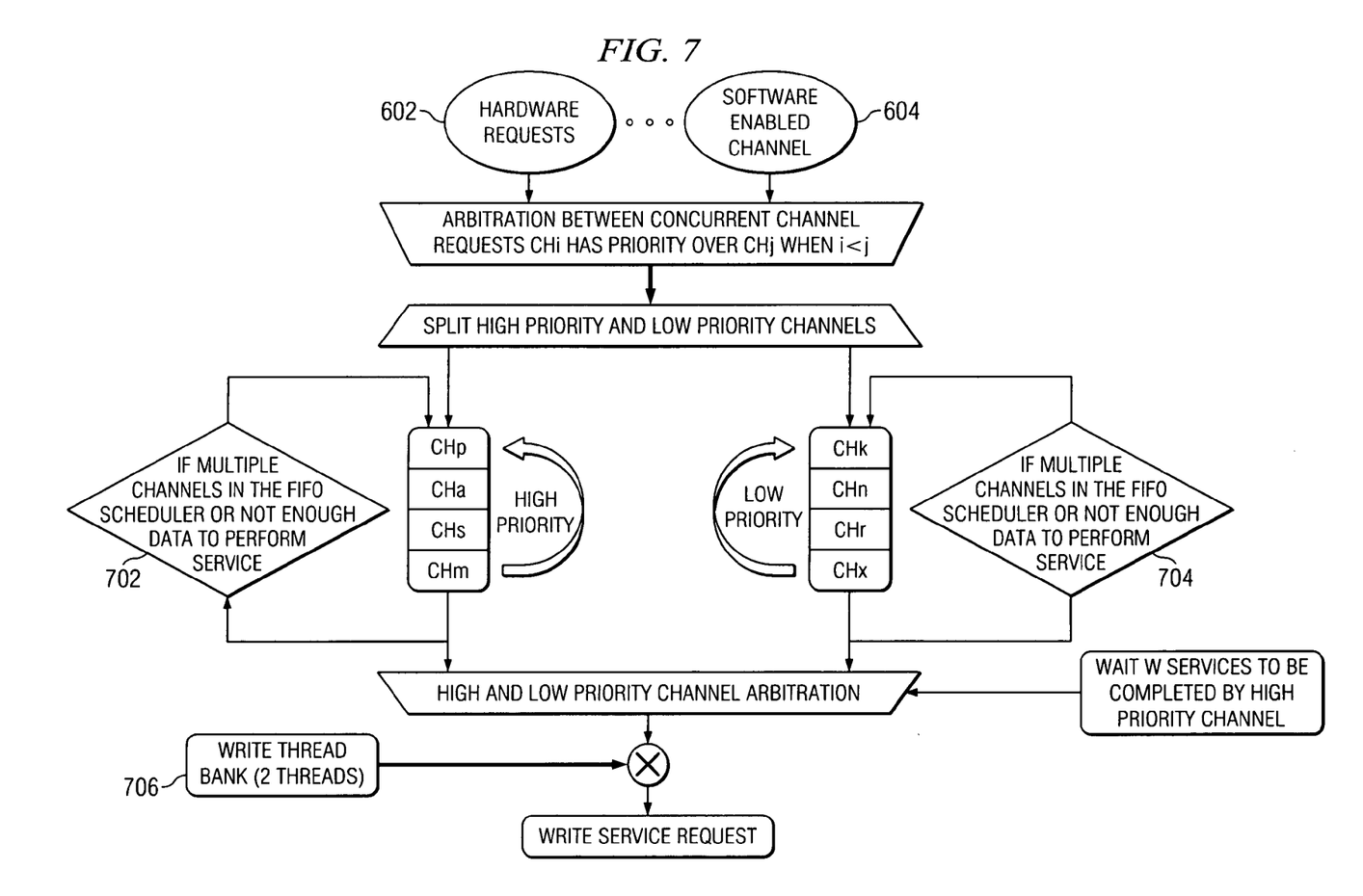
FIG. 7 shows a block diagram of a DMA write port scheduler in accordance with an embodiment of the invention.

Referring now to FIG. 6, there is shown a functional diagram of the read port scheduler 302. Hardware 602 and software enabled channel requests 604 are received into the scheduler and go through a first level of arbitration in block 606. In block 605, the channel requests are split into high priority and low (regular) priority channels. The logic for determining what characterizes a high priority and low priority channels are dependent on the system design requirements. The high priority channels go to arbitration logic 606 were arbitration between concurrent channel requests occurs. For example, depending on the arbitration rules, Chi may have priority over Chj when i<j. The low priority channels go through the low priority channel arbitration logic 612, High and low priority channel scheduling and rescheduling for the high priority channels occurs in 610, while the low priority channel scheduling and rescheduling occurs in 612. Another arbitration between the high and low priority channels occurs in 614 according to the weight (W) given to the high priority channels provided via block 616. The available read threads 618 are allocated and provided to the read service request 620. In FIG. 7, there is shown a write port scheduler block diagram similar to the read port scheduler shown in FIG. 6.

Figure 8:
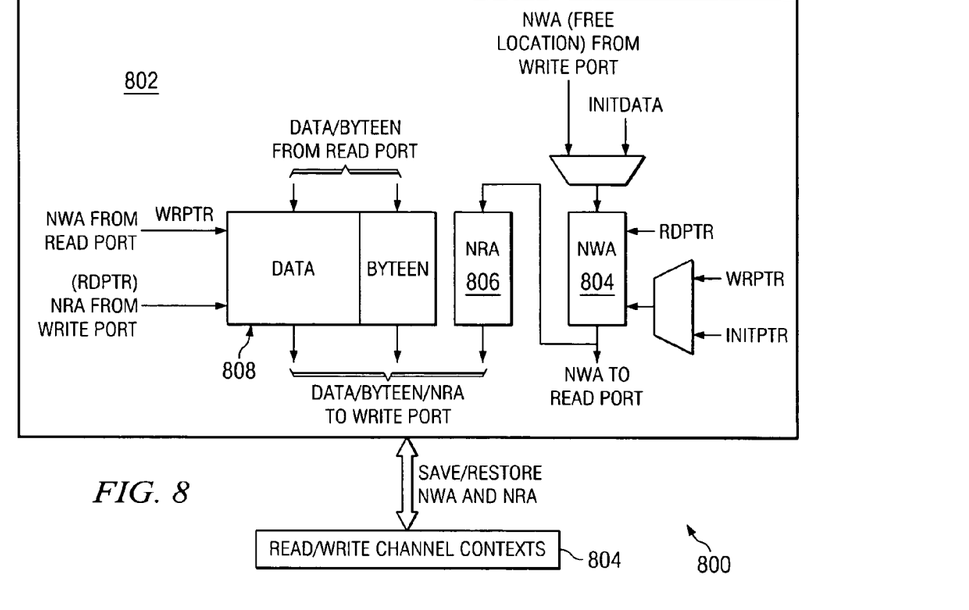
FIG. 8 shows a block diagram of a FIFO circuit in accordance with an embodiment of the invention.

Referring to FIG. 8, there is shown a block diagram of a data FIFO 800 used in accordance with an embodiment of the invention. Data FIFO is similar to the memory shown in FIG. 3 (314, 332 and 334). Data FIFO 800 contains all the data transmitted from the read port 202 to the write port 204 in DMA 200. The data FIFO 800 is shared with no restriction between all of the channels. In one embodiment, the data FIFO 800 has a memory size of 2FD×(OCP_width+byteen_width+FD) with the FD and the OCP_width being generic RTL parameters (byteen stands for byte enable). A typical value as an illustrative example can be FD=8 and OCP_width=32 (byteen_width=4), resulting in a 256×(32+4+8) bit shared data FIFO. For FD=8 and OCP_width=64 (byteen_width=8), the FIFO size will be 256×(64+8+8).

The data FIFO relies on two main memory resources, the shared data FIFO memory 808 and the NextWrite address FIFO (NWA) 804. The shared data FIFO memory 808 contains all of the data transmitted from the read port 202 to the write port 204. It should be noted that the term FIFO is used by reference to the functionality as seen from the user's perspective; the actual implementation uses random access memory (e.g., SRAM). The data FIFO 808 also contains the byteen (byte enable) and the next read address (NRA) where to read the next data from the channel currently granted on the DMA write port side. The NWA FIFO 804 (e.g., having a size of ($2^{FD-1}$×2FD)) allocates the next address where to write the next data of the channel currently serviced on the read port side. The NWA FIFO 804 is a true FIFO memory, preferably implemented using RAM memory such as SRAM. The NWA and NRA are saved/restored in the read/write channel contexts 804. New locations are allocated to a channel only if the current allocated location(s) is full, or the channel is being scheduled for the first time.

A set of run-time registers 318 (see FIG. 3) are associated with the memory resources such as a per channel counter that continuously monitors the number of data in the channel FIFO. These counters are used to limit the maximum number of entries any logical channel can use in the data FIFO 800.

The dynamic buffer allocation is based on a chaining mechanism, managed according to a set of rules. CH(,thID) is used to designate channel i having been allocated thread thID.

Some of the rules include:
1). Reset assumption: Following a reset condition (hard or soft), the NextWriteAddress FIFO is initialized with a sequence of consecutive addresses: 0 to $2^{FD}-1(2^{FD}$ values). A bist like engine can be used to accomplish this which writes the values in the memory after reset.
2). DMA read port (202) side:
When a requesting channel gets granted on the DMA read port, if the channel is scheduled for the first time, then a new NextWriteAddress is requested from the NWA memory 804 (the associated memory field) and loaded into the NextWriteAddress(thID) register. If the channel is scheduled again after being suspended, then the NextWriteAddress(thID) register is loaded from the associated memory field in the channel context memory read during the restore operation.
When a response for CH(i,thID) is received on the DMA read port, the associated response data is written into the data memory at address NextWriteAddress(thID). The corresponding byte enable pattern is also written into the FIFO, since it is used on the other side in order to handle address alignment issues.
The current NextWriteAddress FIFO output value is simultaneously written into the NextReadAddress memory (same address as NextWriteAddress) if the location in the data FIFO pointed to by the NextWriteAddress is full.
The current NextWriteAddress FIFO output value is simultaneously written into the NextWriteAddress (thID) register if the location in the data FIFO pointed to by the NextWriteAddress is full.
When the current channel is ungranted on the DMA read port, the channel context restore operation includes saving of the current NextWriteAddress(thID) register into the associated memory field.
3). DMA Write Port (204) side:
When a requesting channel gets granted on the DMA Write Port, the channel context restore operation includes loading the NextReadAddress(thID) register from the associated memory field.

When CH(i,thID) is granted on the DMA Write Port (204), the new data to be written on the DMA Write Port (204) is read from the data memory at address NextReadAddress(thID).

Preferably in a simultaneous fashion, the NextReadAddress value is written into the NextWriteAddress FIFO (meaning the memory location is now free and can be used for a new data) if all the data at that location is processed.

Also, the NextReadAddress(thID) is preferably updated simulataneously from the value read at that same address, from the NextReadAddress memory, if all the data at that location is processed. This provides the address of the next data for the current channel.

When the current channel is ungranted on the DMA Write Port (204), the channel context restore operation includes saving of the current NextReadAddress(thID) register into the associated memory field.

The Read Port scheduler 302 must prevent the data FIFO from overflowing. For that purpose, there is a counter that continuously tracks the number of remaining free locations in the FIFO 802. When the FIFO 802 is almost full (full minus the longest burst supported on the read interface), the scheduler 302 stops scheduling the requests, until there is enough room in the FIFO 802. A similar protection mechanism exists on a per-channel basis; so that a channel is not scheduled if there isn't enough provision in its level status counter.

When a logical channel is disabled or aborted because of a transaction error, the system controller (not shown) must make sure that all memory locations used by that channel can be re-used. In case of an abort, if there is any channel data remaining in the FIFO (i.e. the channel status counter is not 0), all these data are extracted from the FIFO 802 but discarded, so that all addresses can be effectively re-allocated.

Some of the generic parameters used with the FIFO 800 include: N, the number of logical channels, OCP_wdith, which is the width of the data ports and of the internal data path, FIFO_depth, which is the depth of the data FIFO shared between all of the channels, the FIFO_depth can be chosen as a power-of-two as an example, in that case, the FIFO_depth can be expressed as $2^{FD}$. Some of the memory requirements include for a two-port main memory, $2^{FD} \times$ (OCP_width+OCP_width/8+FD) and for a two-port memory for the FIFO, $2^{(FD-1)} \times (2*FD)$. It should be noted that the data memory size is not directly linked to the number of logical channels. In order to obtain good performance, it is recommended that the FIFO_depth is set to a value between 4×N and 8×N. If the FIFO_depth is not a power-of-two, FD corresponds to the next power-of-two. As an illustrative example, 32 channels (N=32), OCP_width=32, Memory_depth=256=$2^8$, Main memory: e.g., 256×44 and FIFO memory: e.g., 128×16, other memory sizes can also be used depending on the design requirements.

On each schedule, the information related to the scheduled channel is saved on a thread basis both for the read 202 and write 204 ports. The incoming data from the read port 202 is saved in the data FIFO 800 based on the information saved during the schedule cycle. Before the data is put in the FIFO endian conversion 324 and transparent copy operations are performed on the data. On the write port side the data is taken out of the FIFO and aligned to the destination address for that channel. In case of a solid fill, the write data is provided based on a register value instead from the FIFO 800. During the schedule information, if a channel abort bit has been set, the FIFO 800 is cleared up and all the locations used up by the aborted channel are restored. The incoming data is first accumulated in a register (one for each thread) and when the register is full or when the end of the data transfer has occurred for the thread, then the data is written into the FIFO 800. This is done because a single read on the read port 202 can cause multiple writes to the FIFO. If this happens for all the threads at the same time, the FIFO 800 writes cannot keep up with the incoming data. When the FIFO memories are accessed during CPU BIST, the normal operation of the FIFO 800 will be interrupted (i.e., functional FIFO read and writes will be missed).

The FIFO operation includes the data alignment operation performed by the endianness conversion logic (see 324 in FIG. 3) and the address alignment control 328. The endian conversion of the data is preferably performed at the input of the data FIFO while the alignment to the destination address is performed at the output of the data FIFO. These functions are implemented as part of the data FIFO manager. In the DMA 200, for the address programming registers for the source target and the destination target it assumed that the start addresses are always aligned on an element (data type) boundary. If the data type is s8 (8 bit scalar data) for example, then the addresses can have any value. If the data type is s16 (16 bit scalar data), then the addresses must be aligned on 16 bits (lowest bit of the address is 0). If the data type is s32 (32 bit scalar data), then the addresses must be aligned on 32 bits (the lowest 2 bits of the address are 00).

Even if both the source start address (CSSA) and the destination start address (CSDA) of a channel are aligned on the data type, they may still not be aligned on the OCP port width. For example, the data type is s8 and the CSSA=0×1 and CSDA=0×3. In this illustrative example, the data read from the source side (read port) cannot be directly sent to the destination side (write port). The source data from the OCP read port is directly written into the data FIFO after endian conversion. When the data is read from the FIFO to be sent to the destination on the OCP write port, then it is aligned to the destination address.

Figure 9:
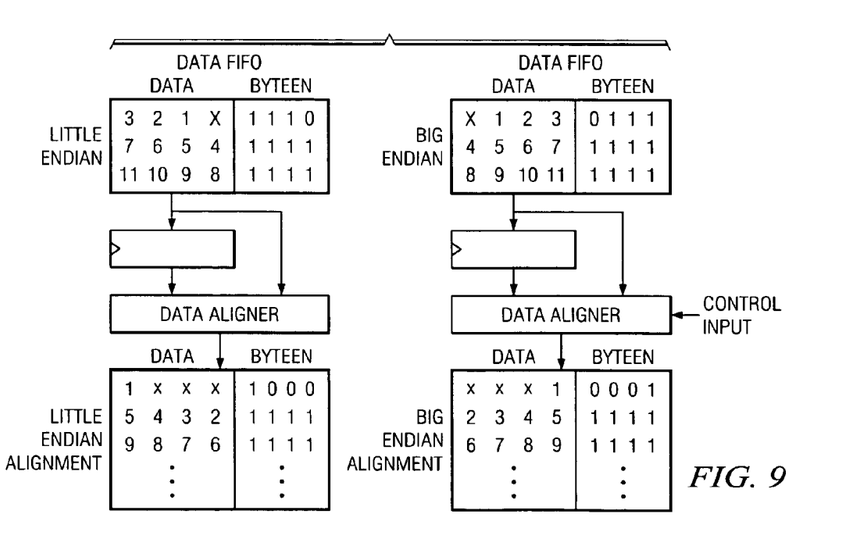
FIG. 9 shows a functional block diagram highlighting the data alignment and endian conversion in accordance with an embodiment of the invention.

With regard to the endianness conversion logic 324 which is implemented as part of the overall FIFO data manager function, if the source and destination endianness are different, then the source data has to be converted to the destination endianness. Preferably, the endianness conversion is done on the data type boundary and before the data is written into the data FIFO 314. Table 1 below shows all of the possible combinations. FIG. 9 shows a functional block diagram highlighting the data alignment and endian conversion in accordance with an embodiment of the invention.

TABLE 1

Endian Conversion

| OCP bus width | Data type | Little Endian | Big Endian | comment |
|---|---|---|---|---|
| 32 | 32 | 33 22 11 00 | 33 22 11 00 | No change |
| 32 | 16 | 33 22 11 00 | 11 00 33 22 | Swap on 16 bit |
| 32 | 8 | 33 22 11 00 | 00 11 22 33 | Swap on 8 bit |
| 64 | 32 | 77 66 55 44<br>33 22 11 00 | 33 22 11 00<br>77 66 55 44 | Swap on 32 bit |
| 64 | 16 | 77 66 55 44<br>33 22 11 00 | 11 00 33 22<br>55 44 77 66 | Swap on 16 bit |
| 64 | 8 | 77 66 55 44<br>33 22 11 00 | 00 11 22 33<br>44 55 66 77 | Swap on 8 bit |

The DMA 200 with unified data FIFO of the present invention allows for the maximum number of channels to be active concurrently. In contrast to some prior solutions, the DMA with unified data FIFO allows for maximum use of the data FIFO. Thereby increasing the DMA's data transfer performance. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A data storage area for use in a direct memory access (DMA) circuit comprising:
   a data memory which is shared by a plurality of channels supported by the DMA circuit;
   a next read address storage area coupled to the data memory, the next read address storage area stores a next read address indicative of where to read a next data associated with a DMA write over a first currently granted channel; and
   a next write address storage area coupled to the data memory, the next write address storage area allocates a plurality of next write addresses, each of the plurality of next write addresses indicative of where to write the next data associated with a DMA read over a second currently granted channel.

2. The data storage area as defined in claim 1, wherein the data memory comprises a static random access memory (SRAM) or flip-flop based memory.

3. The data storage area as defined in claim 1, wherein the data memory is allocated dynamically in order to maximize the number of channels from among the plurality of channels to be scheduled and concurrently active.

4. The data storage area as defined in claim 1, a means coupled to the data memory for controlling the amount of memory in the data memory each channel that is active amongst the plurality of channels can use.

5. The data storage area as defined in claim 1, wherein the data memory stores data written into the data memory as part of the DMA write.

6. The data storage area as defined in claim 5, the data memory stores the next read address, indicative of where to read the next data associated with the DMA write over the first currently granted channel.

7. The data storage area as defined in claim 6, wherein if a requesting channel gets granted for a DMA write, a new next write address is retrieved from the next write storage area if the channel that has been granted has been scheduled for the DMA write for the first time.

8. The data storage area as defined in claim 6, wherein the next read address storage area is integral to the data memory.

9. The data storage area as defined in claim 6, wherein the next write address storage area comprises a first-in-first out (FIFO) circuit.

10. The data storage area as defined in claim 9, wherein the next write address output value from the next write address FIFO circuit is written into the next read address storage area.

11. A direct memory access (DMA) circuit, comprising:
    a read port;
    a write port; and
    a unified shared FIFO circuit coupled to the read and write ports, the unified shared FIFO circuit includes:
        a data memory which is shared amongst a plurality of channels supported by the DMA circuit; and
        a next write address storage area coupled to the data memory, the next write address storage area allocates a plurality of next write addresses, each of the plurality of next write addresses indicative of where to write a next data of a channel currently being serviced on the read port.

12. The DMA circuit as defined in claim 11, wherein the data memory includes a next read address storage area, the next read address storage area stores a next read address indicative of where to read the next data from a channel currently granted on the write port.

13. The DMA circuit as defined in claim 12, wherein the data memory is allocated dynamically in order to maximize the number of channels from among the plurality of channels to be scheduled and concurrently active.

14. The DMA circuit as defined in claim 13, wherein the next write storage area comprises a first-in-first-out (FIFO) circuit.

15. The DMA circuit as defined in claim 13, further comprising:
    an endianness conversion circuit coupled to an input of the data memory; and
    an address alignment control circuit coupled to an output of the data memory.

16. The DMA circuit as defined in claim 15, wherein the endianness conversion circuit performs endianness conversion prior to the data being stored in the data memory.

17. The DMA circuit as defined in claim 13, further comprising:
    a write port scheduler coupled to the write port, the write port scheduler selects the next channel to be serviced and for allocating a thread identifier to a thread associated with a DMA service.

18. The DMA circuit as defined in claim 17, further comprising:
    a read port scheduler coupled to the read port for scheduling the next channel to be serviced by the read port.

19. The DMA circuit as defined in claim 18, wherein the read and write ports both include a high priority and a low priority queue for arbitrating which channel from the plurality of channels supported by the DMA will be serviced.

20. The DMA circuit as defined in claim 18, wherein the read and write ports can work on different data transfers at the same time.

21. The DMA circuit as defined in claim 18, further comprising:
    a means for clearing channel data from the unified shared FIFO circuit in case of one or more channels from amongst the plurality of channels becoming disabled or aborted.

* * * * *